(12) United States Patent
Kang et al.

(10) Patent No.: US 11,174,911 B2
(45) Date of Patent: Nov. 16, 2021

(54) STRUCTURES, LATTICE MATERIALS AND LATTICE CYLINDRICAL SHELLS WITH SIMULTANEOUS STRETCH- AND COMPRESSION-EXPANDING PROPERTY

(71) Applicant: DALIAN UNIVERSITY OF TECHNOLOGY, Liaoning (CN)

(72) Inventors: Zhan Kang, Liaoning (CN); Wenjun Wu, Liaoning (CN); Pai Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/047,872

(22) PCT Filed: Feb. 28, 2020

(86) PCT No.: PCT/CN2020/077105
§ 371 (c)(1),
(2) Date: Oct. 15, 2020

(87) PCT Pub. No.: WO2021/120395
PCT Pub. Date: Jun. 24, 2021

(65) Prior Publication Data
US 2021/0215217 A1    Jul. 15, 2021

(30) Foreign Application Priority Data

Jan. 11, 2020  (CN) .......................... 202010028682.2

(51) Int. Cl.
*F16F 1/00* (2006.01)
*F16F 3/00* (2006.01)

(52) U.S. Cl.
CPC ................. *F16F 1/00* (2013.01); *F16F 3/00* (2013.01); *F16F 2222/00* (2013.01); *F16F 2226/04* (2013.01); *F16F 2228/00* (2013.01)

(58) Field of Classification Search
CPC ........ F16F 1/00; F16F 3/00; F16F 7/00; F16F 2222/00; F16F 2226/04; F16F 2228/00
See application file for complete search history.

(56) References Cited

U.S. PATENT DOCUMENTS

2014/0017422 A1 * 1/2014 Ma .......................... F16F 7/121
428/34.1
2017/0023084 A1 * 1/2017 Guest ........................ F16F 1/37
(Continued)

FOREIGN PATENT DOCUMENTS

CN          204066527 U     12/2014
CN          108591335 A      9/2018
(Continued)

*Primary Examiner* — Vishal R Sahni
(74) *Attorney, Agent, or Firm* — Muncy, Geissler, Olds and Lowe, P.C.

(57) ABSTRACT

The present invention belongs to the technical fields of novel structure design and lattice material design, and refers to structures, lattice materials, and lattice cylindrical shells with simultaneous stretch- and compression-expanding property. First, use the local tension-compression asymmetry in the tension modulus and compression modulus generated by the contact nonlinearity of the tension springs to construct a type of 2D structures and lattice materials with stretch- and compression-expanding property. Then by assembling the 2D structures in different directions, 3D structures and lattice materials can be constructed. Meanwhile, a lattice cylindrical shell can also be constructed by using the 2D stretch- and compression-expanding structures as the unit cell. The structures and lattice materials presented in this invention can be used as a specific functional material and has a promising application in the fields of energy absorption, vibration reduction, medical treatment, wave propagation, intelligent components, and so on.

3 Claims, 4 Drawing Sheets

(56) References Cited

U.S. PATENT DOCUMENTS

2020/0149604 A1* 5/2020 Riedinger ............ G10K 11/172
2020/0375726 A1* 12/2020 Limem ................... A61L 27/50

FOREIGN PATENT DOCUMENTS

| CN | 109365787 A | 2/2019 | | |
|----|-------------|--------|---|---|
| CN | 109519691 A | 3/2019 | | |
| CN | 109551755 A | 4/2019 | | |
| CN | 109858167 A | 6/2019 | | |
| DE | 102007031022 A1 * | 1/2008 | ............. | A47C 23/14 |

* cited by examiner

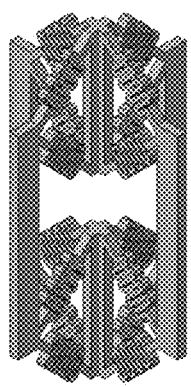 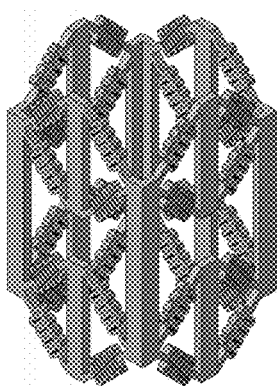 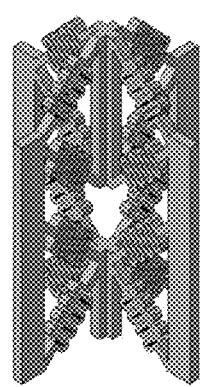 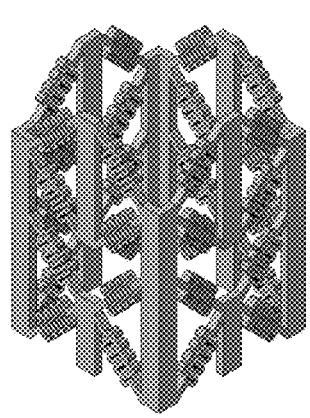
Fig.8(a)  Fig.8(b)  Fig.8(c)  Fig.8(d)
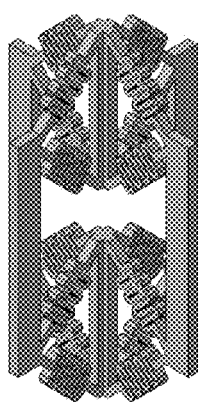 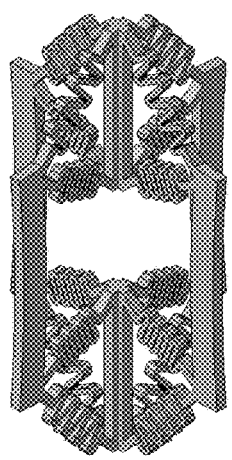 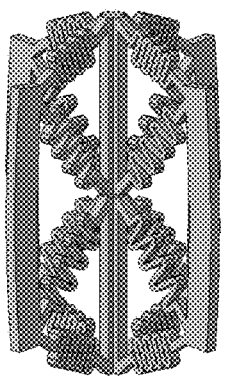
Fig.9 (a)  Fig.9 (b)  Fig.9 (c)
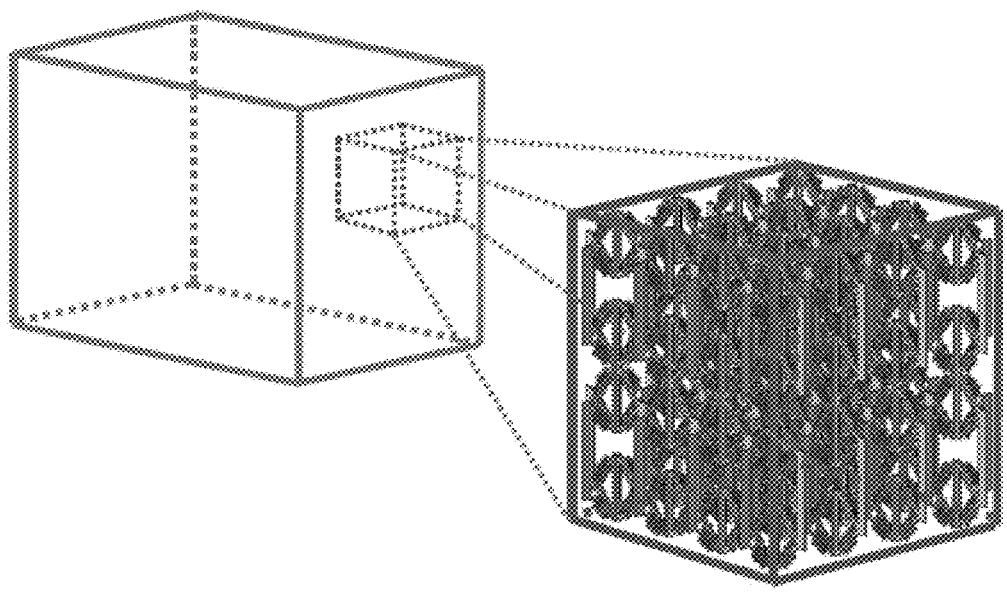
Fig.10

STRUCTURES, LATTICE MATERIALS AND LATTICE CYLINDRICAL SHELLS WITH SIMULTANEOUS STRETCH- AND COMPRESSION-EXPANDING PROPERTY

TECHNICAL FIELDS

The present invention belongs to the technical fields of novel structure design and lattice material design, and refers to structures, lattice materials, and lattice cylindrical shells with simultaneous stretch- and compression-expanding property. Such a lattice material has a positive Poisson's ratio under compression in the specified direction but a negative one under tension.

BACKGROUND

Poisson's ratio is the opposite number of the ratio between transverse contraction strain and the corresponding axial strain under uniaxial tension or compression. Therefore, Poisson's ratio is an elastic constant reflecting the transverse deformation of materials, and it is also known as the transverse elasticity coefficient.

While traditional materials produce elongation (or contraction) along the direction of the applied load, they produce contraction (or expansion) in the direction perpendicular to the load. By the definition of Poisson's ratio, almost all traditional materials have positive Poisson's ratios. There are also some artificial materials possessing negative Poisson's ratios. These materials have mechanical behaviors contrary to the traditional materials, meaning that they expand laterally under uniaxial tension and contract laterally under uniaxial compression.

SUMMARY

The purpose of the present invention is to provide a new type of structure with the stretch- and compression-expanding property, and the corresponding lattice materials and lattice cylindrical shells. These lattice materials have different Poisson's ratio characteristics from traditional materials and negative Poisson's ratio materials.

The present invention provides a new design principle and deformation mechanism. Therein, tension spring modules are introduced into the structures, and there are always one-half of the tension springs in the state of elongation and another half in the state of compression no matter the load is tensive or compressive. By using the contact nonlinearity of the tension springs, the local tension-compression asymmetry in the tension modulus and compression modulus can be generated, thus resulting in expanding deformations under both stretching and compression states. This invention provides two 2D configurations to realize this property. One is a symmetric structure, and the other is an asymmetric structure. The present invention also provides 3D configurations to realize this property. The 3D structures with the stretch- and compression-expanding property are composed of two 2D structures crosslinked with each other or four 2D structures surrounded as a cuboid end to end. Meanwhile, the present invention also provides a type of 2D and 3D lattice materials, which are composed of above 2D or 3D structures serving as the unit cells arrayed in the space. This type of lattice material has an unusual property as they produce lateral expansion under both uniaxial tension and compression.

The technical solution of the present invention is:

Structures with stretch- and compression-expanding property, which including 2D and 3D forms of stretch- and compression-expanding structures. Details are as follows:

(1) 2D stretch- and compression-expanding structures, comprising the following two configurations:

Type 1: 2D stretch- and compression-expanding structures with both top-down and left-right symmetry. The structure is composed of four axial ribs and eight same tension springs. The four axial ribs comprise two same long ribs and two same short ribs; the eight tension springs are divided into two groups, and each group of four springs join together into a square, and a short rib connects one diagonal line of the square. The long ribs are placed parallel to the short ribs and on both sides of the short ribs, and each end of the long ribs is connected to a corner of the spring-joined square. The length of the long ribs is twice of the length of the short ribs. All the angles between the tension springs and the axial ribs are 45°. The clearance, dimension, and parameters of the tension springs can be adjusted according to the actual conditions.

Type 2: 2D stretch- and compression-expanding structures with left-right symmetry but top-down asymmetry. The structure is composed of four axial ribs and eight same tension springs. The eight tension springs are divided into two groups, four springs join together into a square, and the other four form a cross configuration. One axial rib connects one of the diagonal lines of the springs joined square and another axil rib connects one of the angles of the spring-joined cross. The length of the axial rib connected on the cross structure is half of the length of the axial rib in the square structure. Then the two sets of structures are placed along the vertical direction to make the two axial ribs located in the same straight line. One long axial rib connects a corner of the square and two ends of the cross at the left side, and the other long axial rib connects those on the right side. The length of these two ribs is twice of the length of the rib in the square. All the angles between the tension springs and the axial ribs are 45°. The clearance, dimension, and parameters of the tension spring can be adjusted according to the actual conditions.

(2) 3D stretch- and compression-expanding structures, which are assembled by the 2D stretch- and compression-expanding structures in 3D space. They have the following two configurations:

Type 1: the structure is composed of two 2D stretch- and compression-expanding structures. The specific way to construct the structure is as follows: select either 2D stretch- and compression-expanding structure in (1) as the basic configuration, make the planes in which the two 2D stretch- and compression-expanding structures are located perpendicular to each other, and combine the two 2D stretch- and compression-expanding structures at their short ribs, then the two 2D stretch- and compression-expanding structures cross to form a 3D stretch- and compression-expanding cross structure.

Type 2: the structure is composed of four 2D stretch- and compression-expanding structures. The specific way to construct the structure is as follows: select either 2D stretch- and compression-expanding structure in (1) as the basic configuration, using four 2D stretch- and compression-expanding structure to connect end to end at the long ribs and make every adjacent two perpendicular to each other to surround a square section, then the four 2D stretch- and compression-expanding structures construct a 3D cuboid stretch- and compression-expanding structure.

Lattice materials with stretch- and compression-expanding property are composed of one of the above stretch- and compression-expanding structures serving as a unit cell. They are constructed with two methods: (1) use the 2D stretch- and compression-expanding structure as a unit cell and make an in-plane periodic array of the unit cell, then merge the long ribs of adjacent unit cells to construct 2D lattice materials. (2) Use the 3D stretch- and compression-expanding structure as a unit cell and make a 3D space periodic array of the unit cell, then merge the connected ribs of all adjacent unit cells to construct 3D lattice materials.

A lattice cylindrical shell with stretch- and compression-expanding property uses either a 2D stretch- and compression-expanding structure as the unit cell. First, take an axis parallel to the axial ribs of the unit cell as the axis of the cylindrical shell, then make a circumferential array of the unit cell around the axial, merge the long ribs of adjacent unit cells to construct a 3D lattice cylindrical shell with stretch- and compression-expanding property. The diameter of the cylindrical shell will expand no matter the cylindrical shell is under axial tension or axial compression.

The present invention has the following benefits: the present invention provides a new class of structures, which will always expand laterally no matter under uniaxial tension or compression. The lattice materials with this new class of structures as the unit cells have unusual Poisson's ratio characteristics: when a tensile load is applied, these lattice materials expand in the lateral direction, exhibiting a negative Poisson's ratio and behaving like negative Poisson's ratio materials; when a compressive load is applied, these lattice materials also expand in the lateral direction, behaving like a traditional material and exhibiting a positive Poisson's ratio. Such a single material has both positive and negative Poisson's ratios, meaning that the material will expand laterally no matter the axial load is tensive or compressive. This unusual mechanical property can be used as a specific functional material and has a promising application in the fields of energy absorption, vibration reduction, medical treatment, wave propagation, intelligent components, and so on.

DESCRIPTION OF DRAWINGS

FIG. 1(a) and FIG. 1(b) are the two configurations of the 2D stretch- and compression-expanding structures, where FIG. 1(a) is the structure with the top-down symmetry, and FIG. 1(b) is the structure without the top-down symmetry.

FIG. 2(a)-FIG. 2(c) are the schematic diagrams of the first configuration of the 2D stretch- and compression-expanding structure. FIG. 2(a) is the original configuration of the structure, FIG. 2(b) is the schematic diagram of the structure under uniaxial tensile deformation, and FIG. 2(c) is the schematic diagram of the structure under uniaxial compressive deformation.

FIG. 3(a) is the original configuration of the structure, FIG. 3(b) is the schematic diagram of the structure under uniaxial tensile deformation, and FIG. 3(c) is the schematic diagram of the structure under uniaxial compressive deformation.

FIG. 8(a)-FIG. 8(d) show four 3D stretch- and compression-expanding structures composed of the two 2D stretch- and compression-expanding structures.

FIG. 9(a)-FIG. 9(c) are the schematic diagrams of the deformation pattern of the 3D stretch- and compression-expanding structures of the first configuration in FIG. 8. FIG. 9(a) is the original configuration of the structure, FIG. 9(b) is the deformation pattern of the structure under the uniaxial tension, and FIG. 9(c) is the deformation pattern of the structure under uniaxial compression.

FIG. 10 gives 3D stretch- and compression-expanding lattice materials composed of the first 3D stretch- and compression-expanding structures.

DETAILED DESCRIPTION

Specific embodiments of the present invention are further described below in combination with accompanying drawings and the technical solution.

Figures 1, 1A:
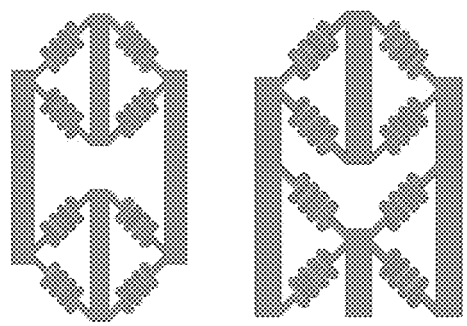
Figures 2, 2A:
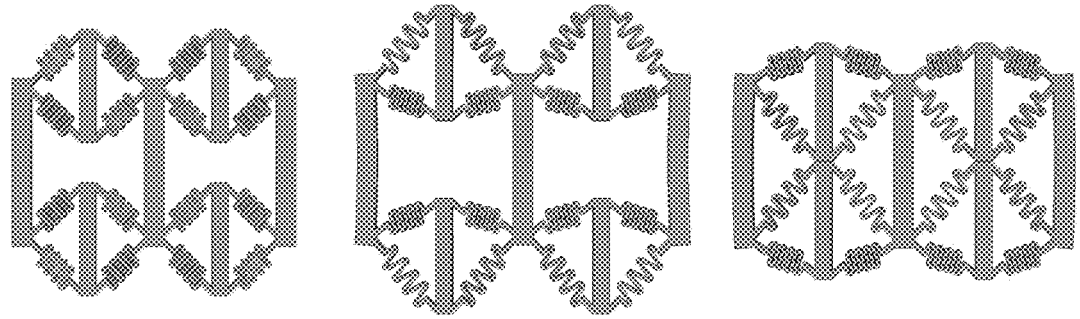
Figure 3:
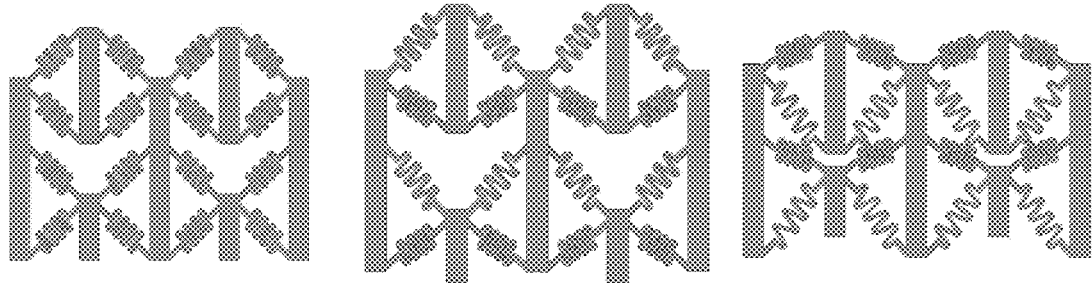
FIG. 3(a)-FIG. 3(c) are the schematic diagrams of the second configuration of the 2D stretch- and compression-expanding structure.
Figure 4:
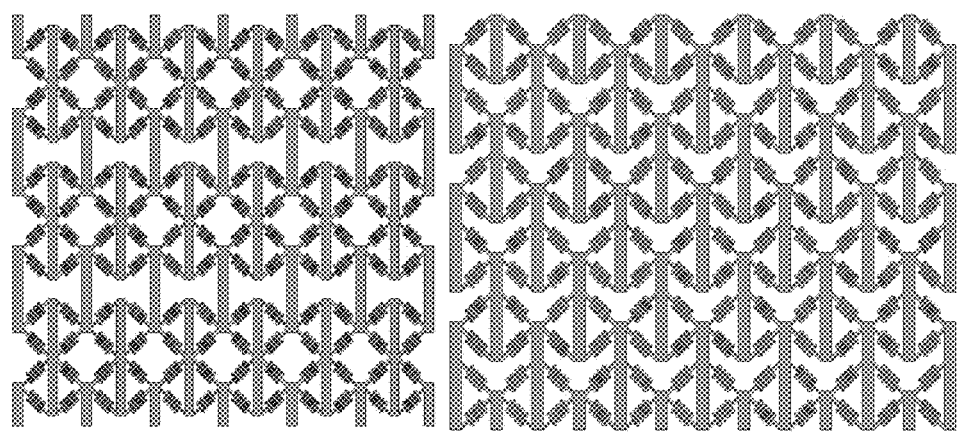
FIG. 4(a) and FIG. 4(b) show two 2D lattice materials composed of the two 2D configurations.
Figure 5:
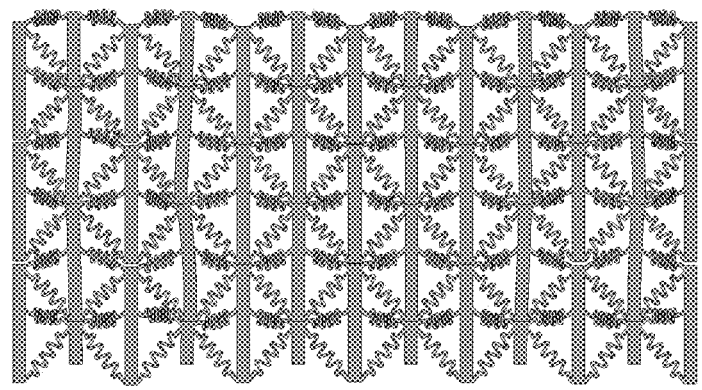
FIG. 5(a) and FIG. 5(b), FIG. 6(a) and FIG. 6(b) are the schematic diagrams of the stretch-expanding deformation and compress-expanding deformation of the two configurations of 2D lattice materials shown in FIG. 4(a) and FIG. 4(b), respectively.
Figure 5:
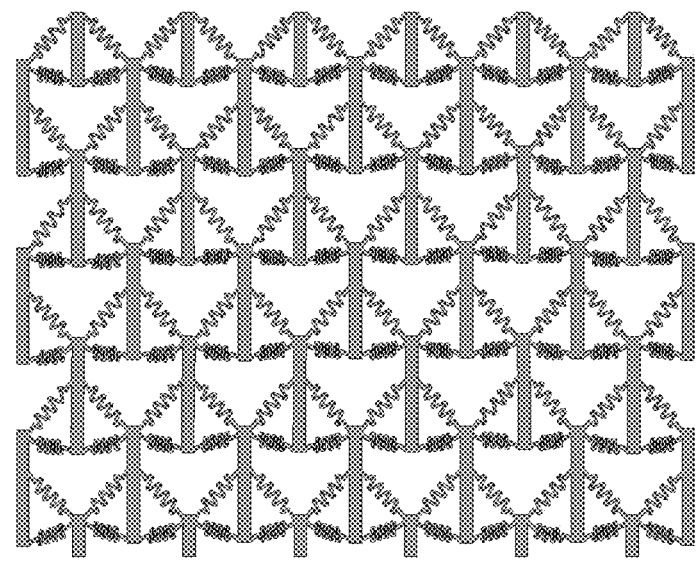
Figure 6:
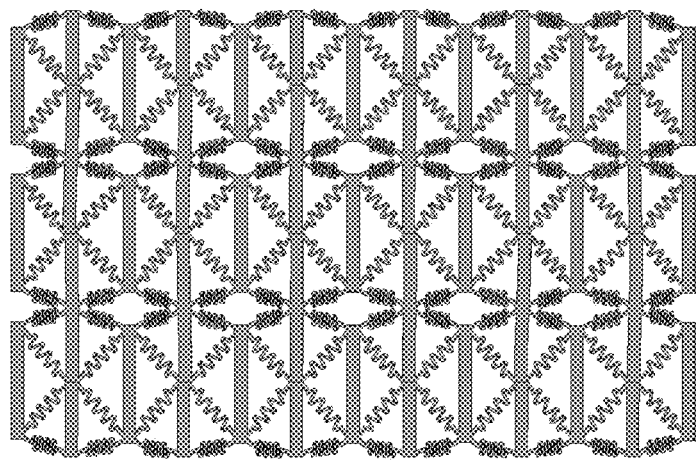
Figure 6:
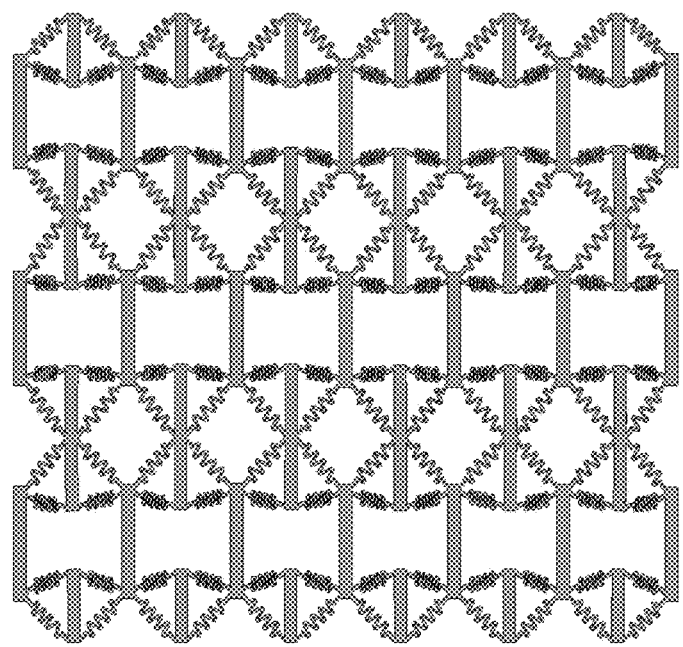
Figure 7:
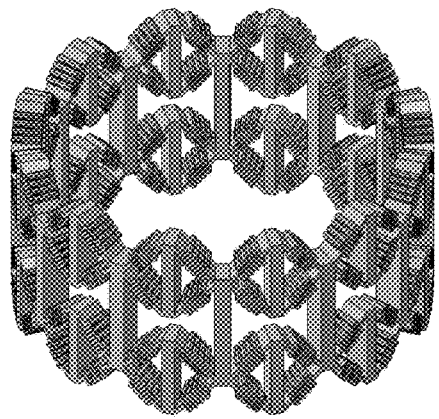
FIG. 7(a) gives a schematic diagram of the stretch- and compression-expanding lattice cylindrical shell.
FIG. 7(b) is the stretch-expand deformation pattern of this lattice cylindrical shell.
FIG. 7(c) is the compress-expand deformation pattern of this lattice cylindrical shell.
Figure 7:
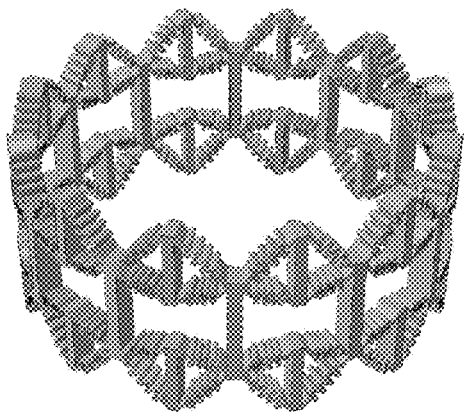
Figure 7:
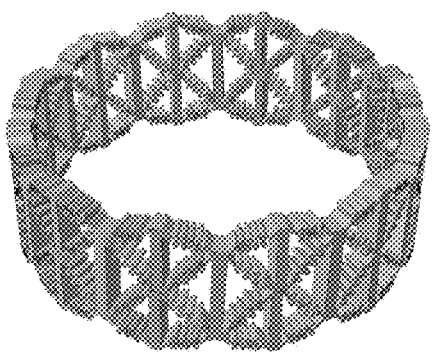

The structures and lattice materials provided by the present invention have unusual Poisson's ratio characteristic, and they have a promising application in energy absorption, vibration reduction, medical treatment, wave propagation, intelligent components, and so on. FIG. 1(a) and FIG. 1(b) give the schematic diagrams of 2D stretch- and compression-expanding structures with top-down symmetry and top-down asymmetry, respectively. FIG. 2(a)-FIG. 2(c) and FIG. 3(a)-FIG. 3(c) give the deformation patterns of uniaxial tension and uniaxial compression of the two structures, respectively. Both structures have one-half of the springs elongated and the other half of the springs compressed no matter the structure is under tensile or compressive loads. The lateral expansion of the structure both under tensile and compressive loads is realized by the tension-compression asymmetry of the modulus of the tension springs. The schematic diagrams of 2D lattice materials constructed by periodic arrays of the two structures are shown in FIG. 4(a) and FIG. 4(b). The lattice materials will expand in the lateral direction both under tensile and compressive loads in the specified direction, and their deformation patterns are shown in FIG. 5(a) and FIG. 5(b), FIG. 6(a) and FIG. 6(b), respectively. In the tensile or compressive deformation of the lattice materials, one-half of the springs are in the tensile state, and the other half of the springs are in the compression state. The stretch- and compression-expanding lattice cylindrical shells composed of 2D structures are presented in FIG. 7(a)-FIG. 7(c). Such a cylindrical shell will expand its diameter once the axial load is applied. This functional material can be used as a new vascular stent and has great application value. By combining 2D stretch- and compression-expanding structures in 3D space, the 3D stretch- and compression-expanding structures can also be constructed. FIG. 8(a)-FIG. 8(d) give four 3D stretch- and compression-expanding structures composed of the two 2D stretch- and compression-expanding structures. FIG. 9(a)-FIG. 9(c) are the schematic diagrams of the deformation patterns of one 3D stretch- and compression-expanding structure. By a periodic array of 3D stretch- and compression-expanding structures in 3D space, 3D stretch- and compression-expanding lattice materials shown as FIG. 10 can be constructed. This 3D lattice material can realize lateral expansion both under a load of tension and compression in the specified direction. All these structures and lattice materials can be prepared by 3D printing technology.

The invention claimed is:
1. A structure with stretch- and compression-expanding property, comprising 2D and 3D forms as follows:
   (1) 2D stretch- and compression-expanding structures, comprising the following two configurations:
   type 1: 2D stretch- and compression-expanding structures with both top-down and left-right symmetry: the structure is composed of four axial ribs and eight same tension springs; the four axial ribs comprise two same long ribs and two same short ribs; the eight tension springs are divided into two groups, and each group of four springs join together into a square, and a short rib connects one diagonal line of the square; the long ribs are placed parallel to the short ribs and on both sides of the short ribs, and each end of the long ribs is connected to a corner of the spring-joined square; the length of the long ribs is twice of the length of the short ribs; all the angles between the tension springs and the axial ribs are 45°; the clearance, dimension, and parameters of the tension springs can be adjusted according to the actual conditions;
   type 2: 2D stretch- and compression-expanding structures with left-right symmetry but top-down asymmetry: the structure is composed of four axial ribs and eight same tension springs; the eight tension springs are divided into two groups, four springs join together into a square, and the other four form a cross configuration; one axial rib connects one of the diagonal lines of the springs-joined square and another axil rib connects one of the angles of the spring joined cross; the length of the axial rib connected on the cross structure is half of the length of the axial rib in the square structure; then the two sets of structures are placed along the vertical direction to make the two axial ribs located in the same straight line; one long axial rib connects a corner of the square and two ends of the cross at the left side, and the other long axial rib connects those on the right side; the length of these two ribs is twice of the length of the rib in the square; all the angles between the tension springs and the axial ribs are 45°; the clearance, dimension, and parameters of the tension spring can be adjusted according to the actual conditions;
   (2) 3D stretch- and compression-expanding structures, which are assembled by the 2D stretch- and compression-expanding structures in 3D space, having the following two configurations:
   type 1: the structure is composed of two 2D stretch- and compression-expanding structures, the specific way to construct the structure is as follows: select either 2D stretch- and compression-expanding structure in (1) as the basic configuration, make the planes in which the two 2D stretch- and compression-expanding structures are located perpendicular to each other, and combine the two 2D stretch- and compression-expanding structures at their short ribs, then the two 2D stretch- and compression-expanding structures cross to form a 3D stretch- and compression-expanding cross structure;
   type 2: the structure is composed of four 2D stretch- and compression-expanding structures, the specific way to construct the structure is as follows: select either 2D stretch- and compression-expanding structure in (1) as the basic configuration, using four 2D stretch- and compression-expanding structures to connect end to end at the long ribs and make every adjacent two perpendicular to each other to surround a square section, then the four 2D stretch- and compression-expanding structures construct a 3D cuboid stretch- and compression-expanding structure.

2. A lattice material with stretch- and compression-expanding property, consisting of the structure with stretch- and compression-expanding property according to claim 1 serving as a unit cell; wherein, the lattice material is constructed with two methods: (1) use the 2D stretch- and compression-expanding structure as a unit cell and make an in-plane periodic array of the unit cell, then merge the long ribs of adjacent unit cells to construct 2D lattice materials; (2) use the 3D stretch- and compression-expanding structure as a unit cell and make a 3D space periodic array of the unit cell, then merge the connected ribs of all adjacent unit cells to construct 3D lattice materials.

3. A lattice cylindrical shell with stretch- and compression-expanding property, using the 2D stretch- and compression-expanding structure according to claim 1 as the unit cell; wherein, first, take an axis parallel to the axial ribs of the unit cell as the axis of the cylindrical shell, then make a circumferential array of the unit cell around the axial, merge the long ribs of adjacent unit cells to construct a 3D lattice cylindrical shell with stretch- and compression-expanding property; the diameter of the cylindrical shell will expand no matter the cylindrical shell is under axial tension or axial compression.

* * * * *